(12) United States Patent
Chen

(10) Patent No.: US 9,340,429 B1
(45) Date of Patent: May 17, 2016

(54) PREPARATION METHOD FOR GRAPHITIZING CARBON MATERIAL

(71) Applicant: National Tsing Hua University, Hsinchu (TW)

(72) Inventor: Swe-Kai Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 14/699,779

(22) Filed: Apr. 29, 2015

(30) Foreign Application Priority Data

Nov. 25, 2014 (TW) .............................. 103140730 A

(51) Int. Cl.
*C01B 31/04* (2006.01)
(52) U.S. Cl.
CPC ..................................... *C01B 31/04* (2013.01)
(58) Field of Classification Search
CPC C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32

USPC ......................................................... 423/448
See application file for complete search history.

(56) References Cited

U.S. PATENT DOCUMENTS 6,267,170 B1 * 7/2001 Onuki ................... B22D 18/02
164/113

* cited by examiner

*Primary Examiner* — Daniel C McCracken
(74) *Attorney, Agent, or Firm* — WPAT, P.C., Intellectual Property Attorneys; Anthony King

(57) ABSTRACT

A preparation method for graphitized carbon material is disclosed. The method may include placing a water-cooled copper mold having a water-cooling equipment at a bottom thereof in a vacuum arc melting furnace, wherein the water-cooled copper mold has disposed thereon a graphite crucible with carbon material therein and the graphite crucible has a tungsten rod placed thereon, with a lower terminal of the tungsten rod and the carbon material within the graphite crucible aligning. The method may further include flowing a gas after placing the vacuum arc melting furnace in a vacuum environment before heating the vacuum arc melting furnace to at least 3200 degrees Celsius to graphitize the carbon material and to form a fully graphitized carbon material after cooling.

4 Claims, 2 Drawing Sheets

---

101 placing a water-cooled copper mold having a water-cooling equipment at a bottom thereof in a vacuum arc melting furnace, wherein the water-cooled copper mold has disposed thereon a graphite crucible with carbon material therein and the graphite crucible has a tungsten rod placed thereon, with a lower terminal of the tungsten rod and the carbon material within the graphite crucible aligning

102 flowing a gas after placing the vacuum arc melting furnace in a vacuum environment, before heating the vacuum arc melting furnace to at least 3200 degrees Celsius to graphitize the carbon material and to form a fully graphitized carbon material after cooling

101 placing a water-cooled copper mold having a water-cooling equipment at a bottom thereof in a vacuum arc melting furnace, wherein the water-cooled copper mold has disposed thereon a graphite crucible with carbon material therein and the graphite crucible has a tungsten rod placed thereon, with a lower terminal of the tungsten rod and the carbon material within the graphite crucible aligning

102 flowing a gas after placing the vacuum arc melting furnace in a vacuum environment, before heating the vacuum arc melting furnace to at least 3200 degrees Celsius to graphitize the carbon material and to form a fully graphitized carbon material after cooling

*FIG. 1*

PREPARATION METHOD FOR GRAPHITIZING CARBON MATERIAL

BACKGROUND

1. Technical Field

The present disclosure relates to a preparation method for graphitizing carbon material, in particular, to a preparation method for graphitizing the carbon material using a vacuum arc melting furnace in order to meet the demand of the graphitizing with the graphitized carbon material to be used as a negative electrode of lithium battery.

2. Description of Related Art

In a traditional isotropic graphite manufacturing process, coke is used to be mixed with coal tar pitch before being injected into a compression mold and being heat in a non-oxidation condition to around 1000 degrees Celsius to form porous amorphous carbon. The pores of the porous amorphous carbon may be filled by the coal tar pitch soaking and re-baking multiple times, after which heat processing may be applied to produce high-density amorphous carbon.

With the energy-storing technology rapidly developing, the isotropic graphite material that is of high density, high strength, high purity, and being readily tooling-prone has been in high demand. Due to the complexity of the corresponding manufacturing process, the graphite produced by the traditional approach rarely satisfies the quality demand. Recently, other manufacturing approaches taking advantage of MESO-carbon micro-beads capable of self-sintering without any mixing, kneading, or smashing, and requiring no coal tar soaking and re-baking to fill the pores. The mechanical characteristics of the isotropic graphite have improved and the corresponding manufacturing has been simplified.

In order to use such recently developed method for preparing the graphite carbon material, one high-temperature furnace for graphitizing along with heat exchange arrangement are necessary to heat the chamber, maintain the operating temperature, and protect the main body of the carbon material. The heat transmission, the maintaining of the operating temperature and the rate of the temperature increasing are subject to the efficiency of the transfer of the heat, requiring a long period of time for the graphitizing to be completed. For example, the graphitizing using the above-mentioned approach may require 1-10 hours to conclude, rendering difficult the maintaining of the operating temperature. At the same time, the crucible used in the process may not ensure such long hours of the operation, negatively affecting the characteristics of the end product of the manufacturing process.

Other disadvantages include: (1) being time-consuming, requiring significant amount of energy, needing additional devices to maintain the operating temperature, which adds extra cost to the implementation of the melting furnace, being limited in the mass production performance, and eventually increasing the corresponding manufacturing cost; (2) being difficult in better utilizing the heat applied at the expense of the heat efficiency and energy consumption when the furnace could not operate without interruption; (3) reaching 2300 degrees Celsius as its maximum temperature, which fails to be fully graphitizing the carbon material as 3200 degrees Celsius is required as theoretically suggested, and therefore makes it difficult to meet the quality standard of the ideal graphite; and (4) virtually impossible for automation with the complicated arrangement for heating electrodes and temperature maintaining of the corresponding furnace in addition to the placement and the extraction of the carbon material.

Thus, the present disclosure that uses the vacuum arc melting furnace to heat the carbon material could be one of the better options to be considered. The present disclosure preparation method could be realized by having the operating temperature reach at no less than 3200 degrees Celsius in a relatively short period of time because of the temperature increasing capability of the melting furnace, not only shortening the time for the graphitizing but also ensuring the carbon material to be fully graphitized in each and every attempt.

SUMMARY OF THE DISCLOSURE

The present disclosure is to provide a preparation method for graphitizing the carbon material using the vacuum arc melting furnace for realizing the full graphitizing. The prepared graphite carbon material may be used in the negative electrode of lithium battery.

The present disclosure may include placing a water-cooled copper mold having a water-cooling equipment at a bottom thereof in a vacuum arc melting furnace, wherein the water-cooled copper mold has disposed thereon a graphite crucible with carbon material therein and the graphite crucible has a tungsten rod placed thereon, with a lower terminal of the tungsten rod and the carbon material within the graphite crucible aligning. The method may further include flowing a gas after placing the vacuum arc melting furnace in a vacuum environment before heating the vacuum arc melting furnace to at least 3200 degrees Celsius to graphitize the carbon material and to form a fully graphitized carbon material after cooling.

More specifically, the gas flown into the vacuum environment is argon or helium.

More specifically, the lower terminal of the tungsten rod facing the graphite crucible is tip-shaped.

More specifically, the water-cooled copper mold is equipped with a recess in which the graphite crucible is placed.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows:

FIG. 1 is simplified flow chart of a preparation method of graphitizing carbon material according to one embodiment of the present disclosure.

DESCRIPTION OF THE EXEMPLARY EMBODIMENTS

Figure 2:
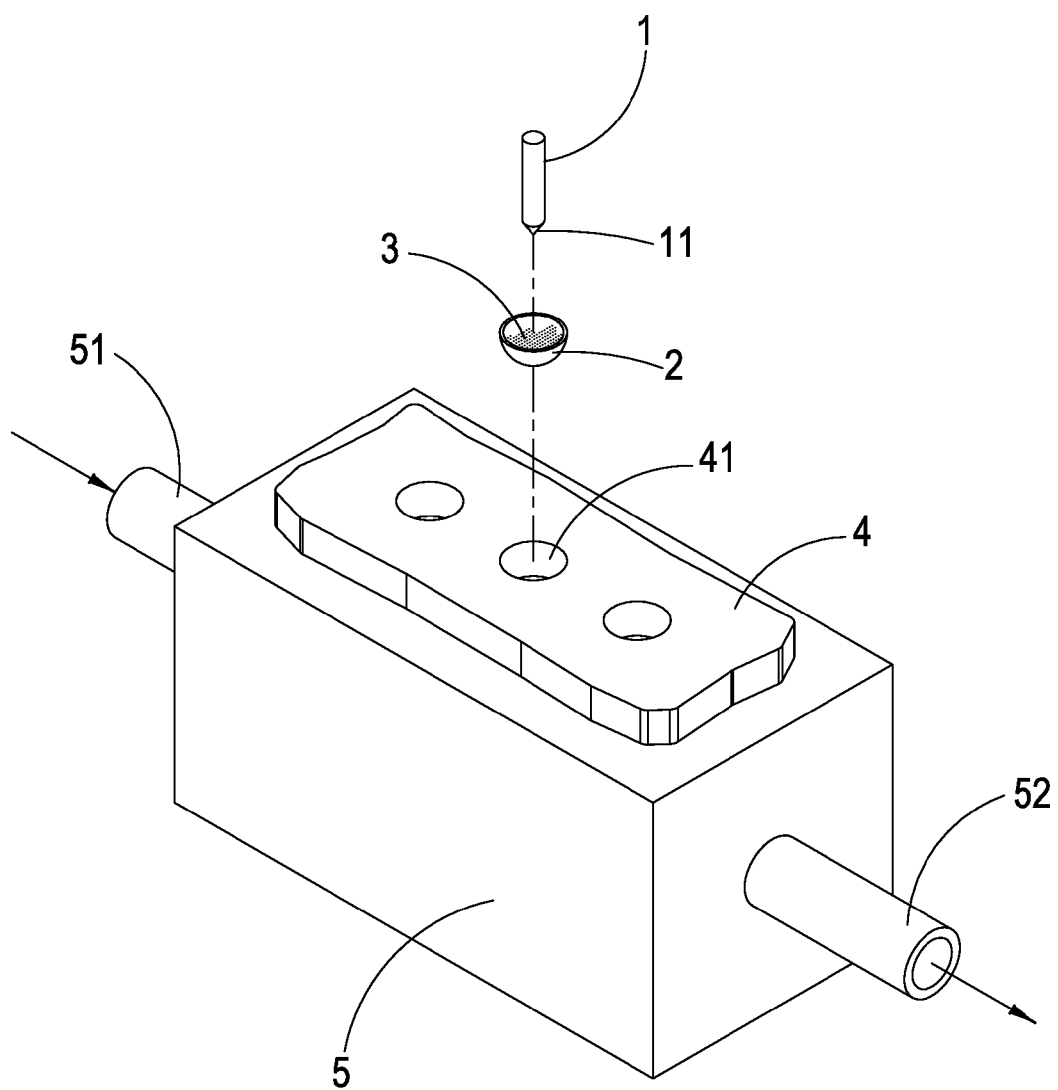
FIG. 2 is a schematic diagram of a chamber of a vacuum arc melting furnace used in the preparation of the graphite carbon material according to one embodiment of the present disclosure.

The aforementioned and other technical contents, features, and efficacies will be shown in the following detail descriptions of a preferred embodiment corresponding with the reference Figures.

Please refer to FIG. 1 of a simplified flow chart of a preparation method of graphitizing carbon material according to one embodiment of the present disclosure. The preparation method may include steps of placing a water-cooled copper mold having water-cooling equipment at a bottom thereof in a vacuum arc melting furnace (step 101). Specifically, the water-cooled copper mold has disposed thereon a graphite crucible with the carbon material therein and the graphite crucible has a tungsten rod placed thereon, with the bottom of the tungsten rod and the carbon material within the graphite crucible aligning. The preparation method may further flow a gas after placing the vacuum arc melting furnace in a vacuum environment, before heating the vacuum arc melting furnace to at least 3200 degrees Celsius to graphitize the carbon material and to form a fully graphitized carbon material after cooling (step 102).

Please refer to FIG. 2 of a schematic diagram of a chamber of a vacuum arc melting furnace used in the preparation of the graphite carbon material according to one embodiment of the present disclosure. Such chamber may include a water-cooled copper mold 4 having water-cooling equipment 5 at the bottom thereof. The water-cooling equipment 5 may include a water inlet 51 and a water outlet 52 allowing for the water when being inputted into and outputted from the water inlet 51 and the water outlet 52, respectively, to help carry the heat associated with the water-cooled copper mold 4 and therefore to lower the temperature of the water-cooled copper mold 4.

Meanwhile, since the water-cooled copper mold 4 may have a recess 41 on its surface in which a graphite crucible 2 is placed. The graphite crucible 2 may have carbon material 3 (in one implementation, in terms of carbon power) contained therein. A lower terminal 11 of a tungsten rod 1 may be tip-shaped while facing the carbon material 3 within the graphite crucible 2. With the above arrangement, the top cover of the vacuum arc melting furnace may be closed and the chamber of the vacuum arc melting furnace may be vacuumed until the pressure is less than $2.4 \times 10^{-2}$ torr. Thereafter, the helium or argon may be flown into the chamber. The vacuuming and the flowing of the argon or helium may be repeated for additional three times, before heating by the vacuum arc melting furnace may begin.

The melting current may be 1000 amperes and the melting voltage may be 100 volts. The vacuum arc may help heat the melting furnace to at least 3200 degrees Celsius, to fully graphitize the carbon material 3, which may be cooled down by the water-cooled copper mold 4 to form the fully graphitized graphite carbon material.

It is worth noting that the graphite crucible 2 and the water-cooled copper mold 4 carrying the graphite crucible 2 may be prevented from being melted due to the high temperature because of the water-cooling equipment 5 and the carbon material 3 may be restrained within certain boundary without being affected by sputtering of the vacuum arc since being placed within the graphite crucible 3.

When the preparation method of the present disclosure utilizes the vacuum arc melting furnace for graphitizing, the characteristics of the vacuum arc melting furnace at least reaching to 3200 degrees Celsius in a relatively quick fashion could shorten the duration associated with the graphitizing the carbon material. As it is well known that heating the carbon material to at least 3200 degrees Celsius could graphitize the carbon material, the relevant discussion or data associated with the same is not further mentioned in the present disclosure.

The preparation method according to the present disclosure compared with its conventional counterpart has the following advantages:

(1) effectively shortening the time for the graphitizing and meeting the demand that the graphitizing could be achieved in each and every attempt by employing the vacuum arc melting furnace capable of heating the chamber thereof to no less than 3200 degrees Celsius in short periods of time;

(2) preventing the graphite crucible and the water-cooled copper mold from being melted by using the water-cooled copper mold equipped with the water cooling equipment for heat exchange to carry the graphite crucible and ensuring the concentration of the carbon material when placed within the graphite crucible without being affected by the sputtering of the vacuum arc; and (3) realizing the massive production as additional graphite crucibles are placed on the water-cooled copper mold.

Some modifications of these examples, as well as other possibilities will, on reading or having read this description, or having comprehend these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. A graphitized carbon material preparation method, comprising:

placing a water-cooled copper mold having a water-cooling equipment at a bottom thereof in a vacuum arc melting furnace, wherein the water-cooled copper mold has disposed thereon a graphite crucible with carbon material therein and the graphite crucible has a tungsten rod placed thereon, with a lower terminal of the tungsten rod and the carbon material within the graphite crucible aligning; and flowing a gas after placing the vacuum arc melting furnace in a vacuum environment, before heating the vacuum arc melting furnace to at least 3200 degrees Celsius to graphitize the carbon material and to form a fully graphitized carbon material after cooling.

2. The preparation method according to claim 1, wherein the gas flown into the vacuum environment is argon or helium.

3. The preparation method according to claim 1, wherein the lower terminal of the tungsten rod facing the graphite crucible is tip-shaped.

4. The preparation method according to claim 1, wherein the water-cooled copper mold is equipped with a recess in which the graphite crucible is placed.

* * * * *